United States Patent [19]

Buchner et al.

[11] Patent Number: 4,638,925

[45] Date of Patent: Jan. 27, 1987

[54] APPARATUS FOR VOLUMETRIC METERING AND DISPENSING OR LIQUIDS

[75] Inventors: Norbert Buchner, Winnenden; Kuno Lemke, Bietighein-Bissingen; Günter Vögele, Schönaich, Fed. Rep. of Germany

[73] Assignee: Robert Bosch GmbH, Stuttgart, Fed. Rep. of Germany

[21] Appl. No.: 718,969

[22] Filed: Apr. 2, 1985

[30] Foreign Application Priority Data

May 12, 1984 [DE] Fed. Rep. of Germany ....... 3417696

[51] Int. Cl.$^4$ .............................................. B67D 5/30
[52] U.S. Cl. ......................................... 222/21; 222/68
[58] Field of Search ....................... 137/426; 141/303; 222/14, 17, 21, 64, 67–69, 450–453, 250

[56] References Cited

U.S. PATENT DOCUMENTS

| | | | |
|---|---|---|---|
| 2,565,045 | 8/1981 | Ray | 2122/69 |
| 3,107,818 | 10/1963 | Carmellini et al. | 222/67 |
| 3,114,478 | 12/1963 | Hilkemeier et al. | 222/21 |
| 3,194,434 | 7/1965 | Evanson | 222/67 |
| 4,284,210 | 8/1981 | Horak | 222/68 |
| 4,386,716 | 6/1983 | Buck | 222/250 |
| 4,405,061 | 9/1983 | Bergandy | 222/67 |

FOREIGN PATENT DOCUMENTS 1648088  4/1971  Fed. Rep. of Germany.

Primary Examiner—H. Grant Skaggs
Attorney, Agent, or Firm—Edwin E. Greigg

[57] ABSTRACT

An apparatus is proposed for volumetric metering and filling of liquids which includes a vertically extending dispensing chamber provided with a lower inflow and outflow opening and an upper vent opening. A float having an indicator ring is freely reciprocable in the dispensing chamber and scanning elements for controlling the inflow or outflow of liquid are disposed outside the dispensing chamber. Further control elements control a retarded inflow or outflow of the liquid via a throttle device, so that the upper and lower height, the criterion for accurate metering out of quantities of liquid, of the surface of the liquid in the dispensing chamber can be regulated.

4 Claims, 1 Drawing Figure

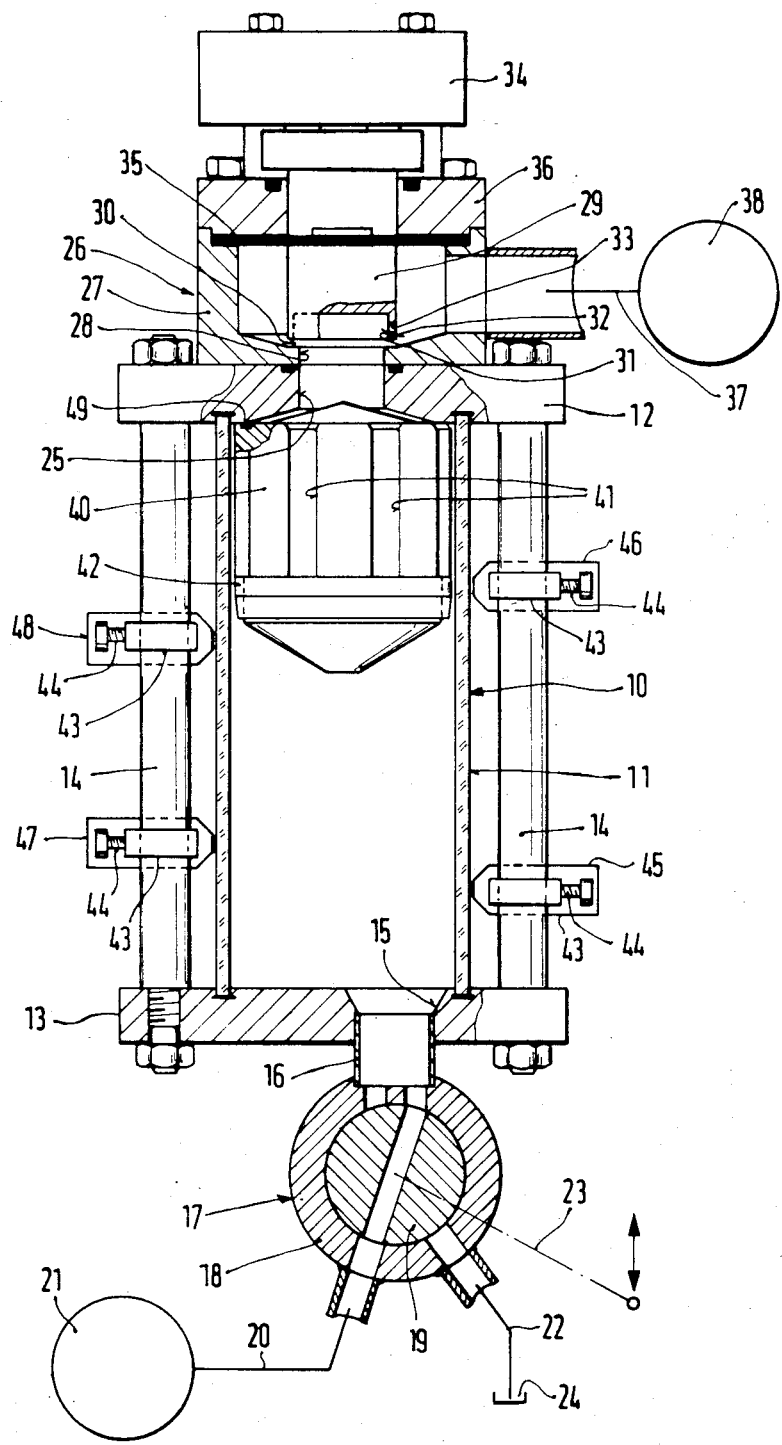

APPARATUS FOR VOLUMETRIC METERING AND DISPENSING OR LIQUIDS

BACKGROUND OF THE INVENTION

The invention is based on a metering apparatus for liquids as generally defined hereinafter. An apparatus for metering out quantities of fluid having a predetermined, invariable volume is known for instance from German Offenlegungsschrift No. 16 48 088. The dispensing chamber of this apparatus is filled by the control valve up to a predetermined level by allowing a liquid which is under pressure to flow in. The inflow of liquid into the dispensing chamber is prevented by a float which is freely movable in the dispensing chamber, which when the intended level of the liquid in the chamber has been reached abuts against a valve seat surrounding the vent opening in the top of the dispensing chamber, thereby blocking off the vent opening. After the control valve switches over, the dispensing chamber empties completely. Since the valve seat is disposed in an unalterable manner in the top of the dispensing chamber, a change in the dispensed volume is impossible. A dispensing apparatus having a readily adjustable dispensing volume for the quantities of liquid to be metered out is therefore desirable.

OBJECT AND SUMMARY OF THE INVENTION

The dispensing apparatus according to the invention revealed later herein has the advantage that a change can be made in the dispensing volume of the apparatus without intervening in the dispensing chamber.

A further advantage is also attained as a result that the dispensing apparatus can be used for aseptic dispensing of liquids.

A particularly advantageous feature of the invention is the disposition of a second scanning element, which controls a delayed inflow or outflow of fluid into or out of the dispensing chamber, so that the predetermined level of liquid in the chamber is attained very accurately. This liquid level is preferably attained in that the vent opening has a throttle associated with it that can be put into and out of action, its effective position being controlled by at least one scanning element.

The invention will be better understood and further objects and advantages thereof will become more apparent from the ensuing detailed description of a preferred embodiment taken in conjunction with the drawings.

BRIEF DESCRIPTION OF THE DRAWINGS

The single figure of the drawing shows a simplified generally cross sectional view of an exemplary embodiment of a metering and dispensing apparatus according to the invention.

DESCRIPTION OF THE PREFERRED EMBODIMENT

A dispensing chamber 10 for liquids has a vertically extending hollow measuring cylinder 11 of glass, a top 12 and a bottom 13. The top 12 and the bottom 13 are retained in a sealing manner against the ends of the measuring cylinder 11 by a plurality of tension bolts 14 distributed uniformly about the outside circumference of the measuring cylinder 11. An inflow and outflow opening 15 is disposed eccentrically in the bottom 13 and a control valve 17 is connected to the opening 15 via a piece of tubular stock 16. The control valve 17, which embodied by way of example as a rotary slide valve having a housing 18 and a rotary slide 19, communicates at one end via a line 20 with a container 21 for liquid and at the other via a line 22 with a filling station for packaging containers 24. The rotary slide 19 of the control valve 17 is rotatable into an inflow position (shown) and an outflow position via a lever 23 about a predetermined angle by means of a reversible drive mechanism, not shown. It will be noted that other known control valves which are arranged to communicate with the dispensing chamber via separate inflow and outflow connections can also be used for controlling the inflow and outflow of liquid to and from the dispensing chamber.

A vent opening 25 is disposed centrally in the top 12 and is covered by an adjustable throttle device 26. The throttle device 26 has a housing 27 with a lower opening 28 coinciding with the vent opening 25 in the top 12. A control means 29 in the housing 27 is axially displaceable toward the opening 28; in its lower position it closes the opening 28 in the housing 27, and in its upper position it leaves open an annular gap 30 between its lower end and the top of the opening 28. A recess 31 is provided in the end of the control means 29. The wall 32 which surrounds the recess 31 has a radially extending perforation 33, which connects the recess 31 in the control means 29 with the hollow chamber of the housing 27. The control means 29 is actuated by a linear drive 34 secured on the housing 27. To maintain sterile conditions in the housing 27 of the throttle device 26 and the dispensing chamber 10, the control means 29 is joined to an annular diaphragm 35 which is fastened in the top portion 36 of the housing 27. Furthermore, the interior of the housing 27 communicates via a line 37 with a chamber 38 in which a sterile gas or air atmosphere is maintained. The chamber 38 may communicate with a chamber not shown, in which the filling station for the packaging containers 24 to be filled is disposed.

A float 40 is disposed in the dispensing chamber 10 or in the measuring cylinder 11 such that it is freely reciprocable. The float 40 takes the form of a cylinder with oppositely extending conical ends. The diameter of the float is somewhat smaller than the inside diameter of the cylinder 11, so that in the cylinder 11 it is guided with a certain degree of play. To enable gases carried along with the inflowing liquid to escape, the float 40 has a plurality of axially parallel grooves 41 in its circumference. The float 40 may comprise a hollow cylinder of metal, or a plastic having closed pores, as well as be constructed of micro glass balls which are suitably glued together. In its lower portion, the float 40 has a closed indicator ring 42 on its circumference. This indicator ring 42 comprises an inductively, capacitively or optically scannable material, and is made preferably of metal.

To determine the lower and upper positions of the float 40, that is, of the indicator ring 42, a lower and an upper scanning element 45 and 46 ar disposed outside the measuring cylinder 11 on one or more of the tension bolts 14. The scanning elements 45, 46 are each secured on one adjusting ring 43 which is axially displaceable on a tension bolt 14 and can be firmly clamped at a given height on a tension bolt 14 using a clamping screw 44. In addition to the scanning element 45 which scans the lower position of the float 40 and the scanning element 46 which scans the upper position thereof, two other scanning elements 47 and 48 are associated with the dispensing chamber 10 outside the measuring cylinder 11, of which one, element 47, is disposed somewhat above the lower scanning element 45 and the other, element 48 is disposed somewhat below the upper scanning element 46.

In the upper end of the float 40, a sealing ring 49 has been inserted, which when it rests on the top 12 of the dispensing chamber 10 closes the vent opening 25 tightly off from the dispensing chamber 10, so that no liquid can escape through the vent opening. Thus the float 40 can also cooperate, in the form of a valve closing member, with the top 12 of the dispensing chamber 10 in order to stop the inflow of fluid into the dispensing chamber and thus fix the upper location of the liquid level in the dispensing chamber.

Known, inductive proximity initiators are preferably used as the scanning elements 45–48. However, scanning elements which function capacitively or optically are also conceivable. In these cases, the material comprising the indicator ring 42 has properties matched to the type of scanning element selected. It should also be noted that the measuring cylinder 11 comprises a material which remains neutral with respect to the function of the scanning elements 45–48 and the indicator ring 42.

OPERATION

The metering and dispensing apparatus described functions a follows:

In the position of the control valve 17 shown in the drawing, communication exists between the supply container 21 for liquid and the dispensing chamber 10, so that liquid can flow through the inflow and outflow opening 15 in the bottom 13 into the measuring cylinder 11. As the level of the liquid in the measuring cylinder 11 rises, the float 40 rises as well. Furthermore, the inflowing liquid positively displaces the air contained in the measuring cylinder 11 through the opening 25 in the top 12 and through the housing 27 of the throttle device 26 and the line 37 into the chamber 38. The flow of the displaced air is substantially unthrottled, since the control means 29, which is located in it upper position, leaves open an annular gap 30 of relatively large cross section between the end of the control means 29 and the opposing wall of the housing. As soon as the float 40 reaches a level at which the indicator ring 42 is detected by scanning element 48, which is in a plane somewhat below that of the scanning element 46, this scanning element 48 controls the linear drive 34, causing the linear drive 34 to move the control means 29 into its lower position. From this instant on, the air escaping from the dispensing chamber 10 can escape only through the perforation 33 in the control means 29, so that under its throttling effect the pressure in the dispensing chamber 10 increases, thereby retarding the inflow of liquid out of the supply container 21. As a result, the level of the liquid in the dispensing chamber 10 rises more slowly than before, so that the surface of the liquid and the float 40 floating on it continue to rise in a damped manner, until the indicator ring 42 is detected by the scanning element 46. At this instant, the scanning element 46 [sic] controls the drive mechanism of the control valve 17 so that the control valve 17 is moved over into its other position, that is, the filling or dispensing position. In this position the control valve 17 connects the dispensing chamber 10 with the filling line 22. At the same time, the linear drive 34 is reversed, so that the control means 29 returns to its upper position.

In the filling position of the control valve 17, liquid flows by gravitational feeding through the inflow and outflow opening 15 in the bottom 13 of the dispensing chamber 10, through the control valve 17 and the line 22 into a prepared packaging container 24, whereupon air can flow out of the chamber 38 back into the upper portion of the dispensing chamber 10 without hindrance from the throttle device 26. As the liquid level in the measuring cylinder 11 drops, the float 40 descends as well. Since during the filling portion of the operation the scanning element 48 is inactivated, the passage of the indicator ring 42 past the scanning element 48 has no effect. However, if the indicator ring 42 on the float 40 enters the scanning range of the scanning element 47, which is disposed somewhat above the plane of the lower scanning element 45, then the scanning element 47 in turn directs the lowering of the control means 29 of the throttle device 26, with the result that air can flow into an upper zone of the measuring cylinder 11 only in a throttled manner through the perforation 33, thereby retarding the outflow of fluid from the measuring cylinder 11. As a result, the level of the liquid drops more slowly in a damped manner, until finally the indicator ring 42 of the float 40 reaches the scanning range of the lowermost scanning element 45. When the indicator ring 42 is detected by the scanning element 45, this element 45 in turn directs a switchover of the control valve 17, so that a new dispensing and filling cycle can begin. Furthermore, the scanning element 45 inactivates the scanning element 47 during the filling of the measuring cylinder 11 and reverses the linear drive 34, so that the control means 29 of the throttle device 26 returns to its upper position and leaves the gap 30 open.

The volume to be metered out of the quantities of liquid to be dispensed can be adjusted and varied without intervention into the dispensing chamber 10 by displacing and adjusting the height at which the lowermost scanning element 45 is located. When it detects the indicator ring 42 of the float 40, the scanning element 45 switches over the control valve 17, thereby terminating the operation of emptying the measuring cylinder 11. Depending on the position of the scanning element 45, which also triggers the control valve 17, the scanning element 47 is adjusted as well; this latter scanning element 47 acts upon the throttle device 26, as described above.

It should furthermore be noted that when the float 40 is embodied as a valve member for the vent opening 25 at the top 12, the upper scanning element 46 can be dispensed with; thus in that case the upper limitation for the column of liquid in the measuring cylinder 11 is determined by the float 40. In this embodiment, the switchover of the control valve 17 is effected upon the request of the apparatus furnishing the containers 24.

The switchover in order to empty the dispensing chamber 10 can also be initiated by a pulse from the associated filling machine. The upper scanning element 46 in this case then indicates the readiness for emptying.

It will also be noted that the disposition of the throttle device can be provided such as to embody a fine stream toward the end of the filling operation, in the inflow and outflow of the liquid as well.

It should further be noted that the described dispensing apparatus can be cleaned and sterilized in a simple manner. To this end, a cleaning or sterilizing agent is introduced from the line 37 through the throttle device 25 into the dispensing chamber 10. There it flows around the float 40 resting on the bottom 13 and escapes through the inflow and outflow opening 15 in the bottom 13 and through the control valve, and then finally flows selectively through the filling line 22 or the line 20 to escape.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for the volumetric metering and dispensing of quantities of liquid, having a jacketed dispensing chamber, a bottom in said chamber provided with a valve-controlled inflow and outflow and a top on said chamber having a vent opening, and a reciprocable float means in said dispensing chamber, further wherein said float means comprises a detectable material thereon which is scannable by a scanning element, further that said apparatus comprises at least two scanning elements disposed at different height locations exteriorly of said jacketed dispensing chamber, one of said scanning elements arranged to cause a controlled retarded inflow and another of said scanning elements arranged to cause or controlled retarded outflow of said liquid, at least one responsive scanning element arranged to control said valve is disposed so that its height is adjustable outside said jacket of said dispensing chamber, and a controllable throttle device associated with said vent opening and controllably positioned by at least one of said scanning elements.

2. An apparatus as defined by claim 1, further wherein said detectable material on said float means is provided with an encircling narrow indicator ring.

3. An apparatus as defined by claim 1, further wherein said throttle device has a control means capable of closing said vent opening and further means in said control means defining a perforation of small cross section.

4. An apparatus as claimed in claim 1 which includes at least four scanning elements, each of said four scanning elements being adjustable along said chamber.

* * * * *